United States Patent [19]
Attix et al.

[11] Patent Number: 5,416,811
[45] Date of Patent: May 16, 1995

[54] PWR RELOAD FUEL ASSEMBLY

[75] Inventors: Douglas J. Attix; Samuel V. Pickerel, Jr., both of Lynchburg, Va.

[73] Assignee: B&W Fuel Company, Lynchburg, Va.

[21] Appl. No.: 192,267

[22] Filed: Feb. 7, 1994

[51] Int. Cl.⁶ .............................................. G21C 3/32
[52] U.S. Cl. ...................................... 376/362; 376/448
[58] Field of Search ............... 376/362, 364, 434, 438, 376/448

[56] References Cited

U.S. PATENT DOCUMENTS 4,127,445  11/1978  Anthony .............................. 376/448
4,325,786  4/1982   Wohlsen .............................. 376/448
4,448,745  5/1984   Anthony .............................. 376/448

Primary Examiner—Daniel D. Wasil
Attorney, Agent, or Firm—Robert J. Edwards; D. Neil LaHaye

[57] ABSTRACT

An upper end fitting for a nuclear fuel assembly that eliminates the problem of free standing fuel assemblies leaning out of range of the lead in provided when installing the reactor upper internals structure. The outer dimensions of each upper end fitting in the fuel assembly are larger than their respective spacer grids and lower end fittings such that the nominal gap between upper end fittings is approximately 0.025 inch.

1 Claim, 2 Drawing Sheets

PWR RELOAD FUEL ASSEMBLY

BACKGROUND OF THE INVENTION

1. Field of the Invention

The present invention is generally related to nuclear fuel assemblies and in particular to reload fuel assemblies that minimize the possibility of damage during installation of the reactor internal structure.

2. General Background

Most of the pressurized water reactors in the United States use tall slender fuel assemblies of square cross section. These fuel assemblies stand side by side in the reactor core. Approximately two hundred fuel assemblies are arranged in the core to approximate a circular cross section. A full core has the general shape of a cylinder. The tops and bottoms of the fuel assemblies are positioned next to each other using locating pins or blocks. There is a nominal gap of usually 0.040 to 0.050 inch between assemblies. During refueling, the fuel assemblies are carefully positioned at the lower end fitting and are free standing until the reactor internal structure for locating the top of the fuel assembly is installed. The fuel assemblies have a structural end fitting at each end and six or more spacers more or less evenly spaced along the height(length). The outside dimensions of these end fittings and spacers are about the same. Having uniform outside dimensions was necessary in early fuel assembly designs which enclosed the whole assembly in a porous shroud. Although the shroud has not been used in some time, the design tendency has been to have all the outside dimensions the same. In at least one pressurized reactor design, the fuel assembly upper end fitting is slightly smaller to provide greater clearance to help with the insertion of fuel into the core. Clearance between fuel assemblies is normally a help with handling and core insertion. The fuel assembly is unrestrained at the upper end as fuel is removed from and inserted into the core and, with adequate lead in capability at the top end fitting, will move laterally if necessary to allow unrestricted passage of an adjacent fuel assembly. It is during installation of the reactor internal structure that the top of the fuel assemblies are the most vulnerable to being crushed. The internal structure is massive and will easily damage a fuel assembly that is out of position. A fuel assembly can be out of position by leaning toward an adjacent assembly and closing the gap between fuel assemblies. Nuclear plant operators have, on several occasions, crushed fuel assemblies during the installation of the internals structure. Dimensional inspection methods developed to address the problem have been unpopular because of the time required and difficulty making accurate measurements under twenty to thirty feet of water. The potential for damage to a fuel assembly depends on the available lead in capability designed into the fuel assembly and the internals structure, the design gap between fuel assemblies, and the accuracy of the alignment of the internals structure to the core as it is installed. The internals structure is aligned by guide pins during installation and special rigging is used to insure that the structure is level and lowered slowly to prevent wave effects. The lead in capability is usually limited by the size of the alignment pins and blocks. The gaps between fuel assemblies will allow enough of the assemblies to lean in one direction until assemblies are touching each other. The movement of the upper end fittings across the gaps can result in a situation of insufficient lead in to allow installation of the internals structure without damage to fuel assemblies. However, a gap between fuel assemblies is needed for fuel handling and fuel insertion into the core.

SUMMARY OF THE INVENTION

The present invention addresses the above problem in a straightforward manner. What is provided is a fuel assembly that reduces the gap between the top components of the fuel assemblies when left unrestrained in the reactor core. The reduced gap minimizes the possibility of damage during installation of the reactor internals structure. The reduced gap is achieved by providing an upper end fitting on each fuel assembly that has outer dimensions that are larger than the spacer grids and lower end fitting of the assembly. This reduces the gap between free standing fuel assemblies while still allowing the room necessary for handling during insertion or removal. The entire outer dimensions or only the corner dimensions of the upper end fitting may be enlarged.

BRIEF DESCRIPTION OF THE DRAWINGS

For a further understanding of the nature and objects of the present invention reference should be had to the following description, taken in conjunction with the accompanying drawings in which like parts are given like reference numerals, and wherein.

DETAILED DESCRIPTION OF THE PREFERRED EMBODIMENT

Figure 1:
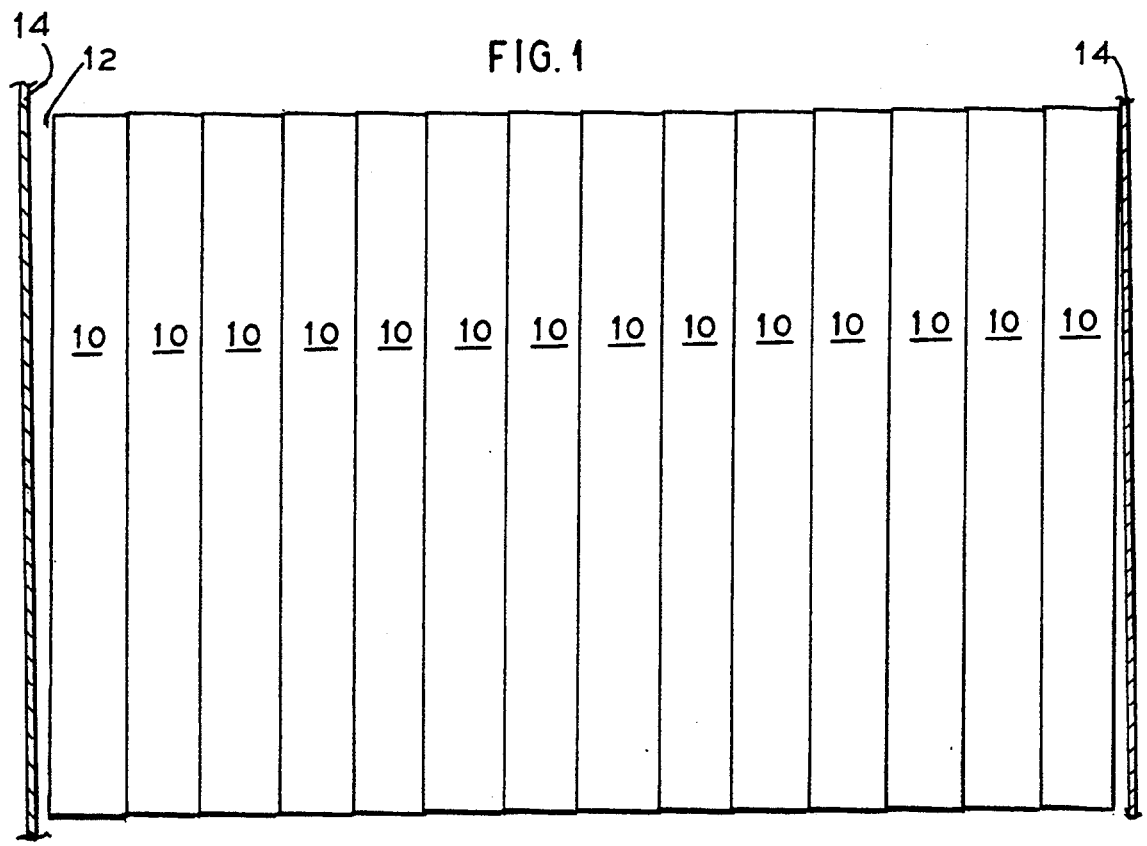
FIG. 1 is a schematic cross section of free standing fuel assemblies in a reactor.
Figure 2:
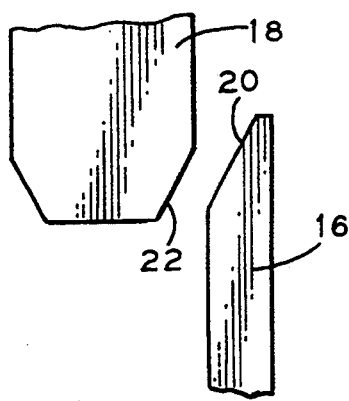
FIG. 2 is a partial view of the reactor internals structure and upper end fitting where the gap is acceptable between the parts.
Figure 3:
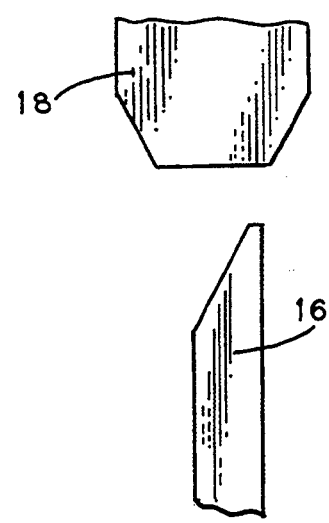
FIG. 3 is a partial view of the reactor internals structure and upper end fitting where the gap is unacceptable between the parts.

FIG. 1 is a schematic cross section of a reactor core that illustrates a plurality of free standing fuel assemblies 10. As can happen when the fuel assemblies are free standing, the fuel assemblies 10 are all leaning in one direction. This results in a relatively large gap 12 between baffle 14 and the closest fuel assembly 10 on one side and little or no gap between baffle 14 and the closest fuel assembly 10 on the opposite side. FIG. 2 illustrates an acceptable relative position between ear 16 of an upper end fitting and pad 18 of the upper reactor internals structure. Ear 16 and pad 18 are respectively provided with beveled edges 20 and 22. The beveled edges serve as lead in surfaces to allow for a certain amount of overlap (lack of a horizontal gap) between ear 16 and pad 18 when the reactor upper internals structure is installed. However, when the gap between fuel assemblies allows enough lean between fuel assemblies to exceed the lead in allowance provided, the undesirable situation illustrated in FIG. 3 occurs. FIG. 3 illustrates the situation that occurs when the lean of the fuel assembly results in the relative positions of ear 16 and pad 18 overlapping to an extent that can not be accommodated by beveled edges 20 and 22. This will result in damage to the fuel assembly that ear 16 is a part of.

Figure 4:
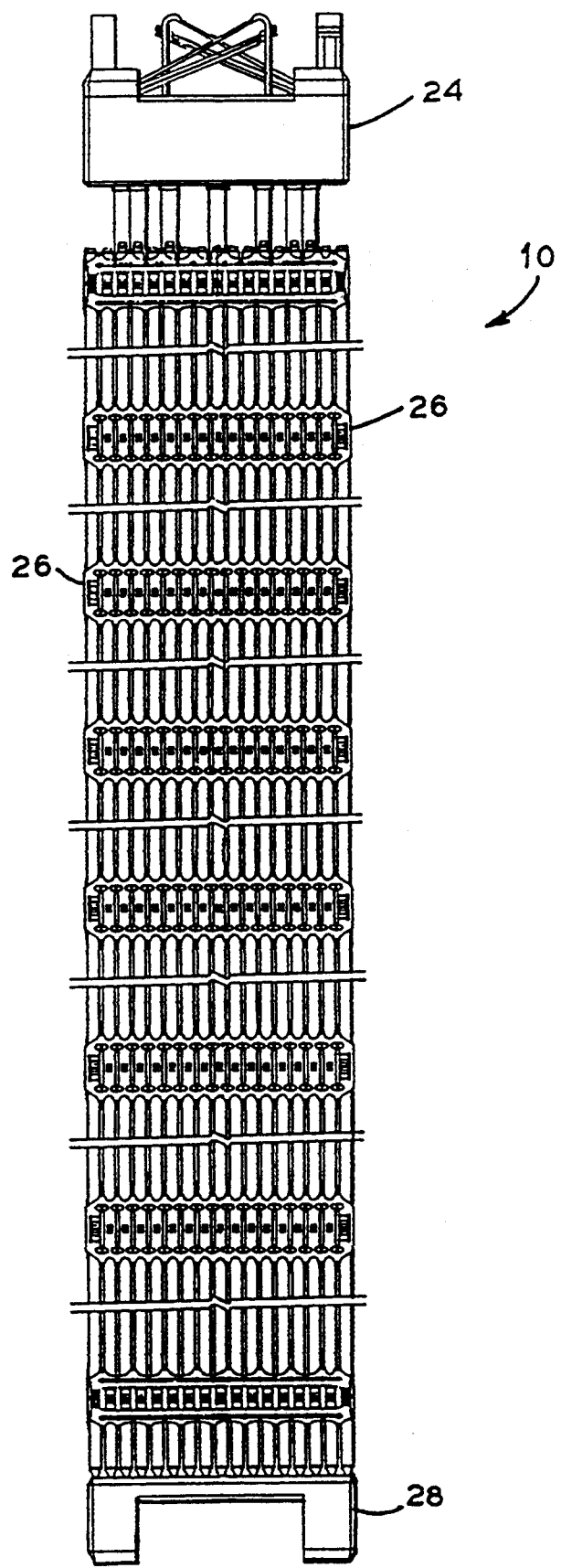
FIG. 4 is an elevation view of the invention installed on a fuel assembly.

The present invention provides for an upper end fitting designed to eliminate this problem. In the schematic of FIG. 1, the upper end fittings have the same outer dimensions as the spacer grids and lower end fittings of the fuel assemblies. As seen in FIG. 4, the present invention solves the problem by providing an upper end fitting 24 for the fuel assemblies 10 that has outer dimensions that are larger than the spacer grids 26 and lower end fittings 28 of the fuel assemblies 10. The larger outer dimensions of the upper end fitting 24 are selected such that the gap between upper end fittings of free standing fuel assemblies is approximately 0.025 inch. The larger outer dimension may be provided by increasing the entire outer dimension of the upper end fitting or by increasing the outer dimension of the corners only to prevent interference with coolant flow. Since it is the gap between the upper ends of fuel assemblies that is important, the size of the upper end fitting and the acceptable gap range between upper end fittings will be dependent upon the reactor design and fuel assembly that the upper end fitting is to be used in.

What is claimed as invention is:

1. In a nuclear reactor having a plurality of fuel assemblies with each fuel assembly formed from a plurality of fuel rods held in a spaced array by an upper end fitting, a lower end fitting, and spacer grids between the end fittings, said upper end fitting having outer dimensions larger than said spacer grids and said lower end fitting such that the gap between upper end fittings of free standing fuel assemblies installed in the nuclear reactor is approximately 0.025 inch.

* * * * *